United States Patent
Lindmark

(10) Patent No.: US 12,328,164 B2
(45) Date of Patent: Jun. 10, 2025

(54) METHODS OF IDENTIFYING ELECTRICAL CONNECTIONS BETWEEN A RADIO FREQUENCY CIRCUIT AND A RADIO, AND RELATED RADIO FREQUENCY CIRCUITS

(71) Applicant: Outdoor Wireless Networks LLC, Claremont, NC (US)

(72) Inventor: Björn Lindmark, Sollentuna (SE)

(73) Assignee: Outdoor Wireless Networks LLC, Claremont, NC (US)

( * ) Notice: Subject to any disclaimer, the term of this patent is extended or adjusted under 35 U.S.C. 154(b) by 339 days.

(21) Appl. No.: 17/797,094

(22) PCT Filed: Feb. 10, 2021

(86) PCT No.: PCT/US2021/017425
§ 371 (c)(1),
(2) Date: Aug. 2, 2022

(87) PCT Pub. No.: WO2021/183253
PCT Pub. Date: Sep. 16, 2021

(65) Prior Publication Data
US 2023/0076708 A1    Mar. 9, 2023

Related U.S. Application Data

(60) Provisional application No. 62/989,112, filed on Mar. 13, 2020.

(51) Int. Cl.
H04B 7/06   (2006.01)
H01Q 1/24   (2006.01)
H01Q 3/26   (2006.01)

(52) U.S. Cl.
CPC .......... *H04B 7/0602* (2013.01); *H01Q 1/246* (2013.01); *H01Q 3/267* (2013.01)

(58) Field of Classification Search
CPC ....... H04B 7/0602; H01Q 1/246; H01Q 3/267
See application file for complete search history.

(56) References Cited

U.S. PATENT DOCUMENTS

| | | | |
|---|---|---|---|
| 6,584,303 B1 * | 6/2003 | Kingswood | H04W 88/08 455/73 |
| 10,276,923 B1 | 4/2019 | Eller et al. | |

(Continued)

OTHER PUBLICATIONS

Antenna Interface Standards Group, Base Standard AISG v3.0 (189 pages) (Nov. 5, 2018).

(Continued)

*Primary Examiner* — Keith Ferguson
(74) *Attorney, Agent, or Firm* — Myers Bigel, P.A.

(57) ABSTRACT

Methods of identifying electrical connections between primary ports of a radio frequency circuit and primary ports of a radio are provided. A method of identifying the electrical connections includes receiving a radio frequency signal via each of the primary ports of the radio frequency circuit. Moreover, the method includes providing, by the radio frequency circuit, different responses to the radio frequency signal that is received via the primary ports, respectively, of the radio frequency circuit. In some embodiments, the different responses are different frequency responses or different delay responses. Related radio frequency circuits are also provided.

17 Claims, 9 Drawing Sheets

(56) References Cited

U.S. PATENT DOCUMENTS

| | | |
|---|---|---|
| 2002/0053995 A1 | 5/2002 | Kim |
| 2005/0266806 A1* | 12/2005 | Soe ........................ H04B 1/403 |
| | | 455/313 |
| 2009/0323786 A1 | 12/2009 | Buer |
| 2016/0156409 A1 | 6/2016 | Chang |
| 2017/0244157 A1 | 8/2017 | Muehlbauer et al. |
| 2019/0260139 A1 | 8/2019 | Jakoby et al. |
| 2019/0334636 A1 | 10/2019 | Li et al. |
| 2019/0386397 A1 | 12/2019 | Son et al. |
| 2020/0044345 A1 | 2/2020 | Zimmerman |

OTHER PUBLICATIONS

Notification of Transmittal of the International Search Report and the Written Opinion of the International Searching Authority, or the Declaration, in corresponding PCT Application No. PCT/US2021/017425 (Apr. 27, 2021).

* cited by examiner

METHODS OF IDENTIFYING ELECTRICAL CONNECTIONS BETWEEN A RADIO FREQUENCY CIRCUIT AND A RADIO, AND RELATED RADIO FREQUENCY CIRCUITS

CROSS-REFERENCE TO RELATED APPLICATION

The present application is a 35 U.S.C. § 371 national stage application of PCT Application No. PCT/US2021/017425, filed on Feb. 10, 2021, which claims priority to U.S. Provisional Patent Application No. 62/989,112, filed Mar. 13, 2020, the entire contents of which are incorporated herein by reference. The above-referenced PCT Application was published in the English language as International Publication No. WO 2021/183253 A1 on Sep. 16, 2021.

FIELD

The present disclosure relates to communication systems and, in particular, to electrical connections to wireless telecommunications network equipment.

BACKGROUND

Wireless telecommunications network equipment may include several ports for Radio Frequency ("RF") signals. When installing the equipment, a human operator will typically manually connect cables to the ports. In many applications, it may be desirable to verify that the connections have been completed properly. When a passive multi-port RF circuit, such as a base station antenna, is connected to a radio source having multiple ports, however, the radio typically does not have a way to know which of its ports is connected to which port of the passive multi-port RF circuit.

As used herein with respect to an RF circuit, the term "passive" refers to a device that does not have active RF components, such as microwave transistor amplifiers or the like. The circuit may, however, include other types of electronic components, such as motors or switches.

SUMMARY

An RF circuit, according to some embodiments herein, may include a plurality of arrays of radiating elements. The RF circuit may include a plurality of primary ports that are coupled to the arrays, respectively. Moreover, the RF circuit may include a secondary port that is coupled to the primary ports via a plurality of different-length RF transmission paths, respectively. To identify electrical connections between the primary ports and a radio, the different-length RF transmission paths may be configured to provide different responses, respectively, to an RF signal that is received via each of the primary ports.

In some embodiments, the RF circuit may be a base station antenna and may further include: a plurality of phase shifters that are coupled between the arrays, respectively, and the primary ports, respectively. The RF circuit may still further include a plurality of RF couplers that are coupled between the phase shifters, respectively, and the primary ports, respectively.

According to some embodiments, the RF circuit may still further include a plurality of power dividers, and the RF couplers may be further coupled to the power dividers. Two of the different-length RF transmission paths may be coupled to two inputs, respectively, of a first of the power dividers. Moreover, the RF circuit may still further include a calibration printed circuit board ("PCB") that includes the power dividers and the different-length RF transmission paths, and the secondary port may be a calibration port of the RF circuit. The primary ports may be further coupled to a plurality of primary ports, respectively, of the radio, and the calibration port may be coupled to a secondary port of the radio.

In some embodiments, a plurality of equal-length RF transmission paths may further couple the primary ports, respectively, to the secondary port. Moreover, the RF circuit may further include a plurality of RF switches that are coupled between the primary ports, respectively, and the secondary port.

According to some embodiments, a first of the different-length RF transmission paths and a first of the equal-length RF transmission paths may be coupled to a first of the RF switches. Moreover, the first of the different-length RF transmission paths and the first of the equal-length RF transmission paths may be coupled between the first of the RF switches and a first of another plurality of RF switches.

In some embodiments, the RF circuit may include a plurality of power dividers. The first of the RF switches and a second of the RF switches may be coupled to two inputs, respectively, of a first of the power dividers.

An RF circuit, according to some embodiments herein, may include first and second primary ports. Moreover, the RF circuit may include a secondary port that is coupled to the first and second primary ports via first and second variable-frequency-response circuitry, respectively.

In some embodiments, the RF circuit may include a power divider. The first and second variable-frequency-response circuitry may be coupled to two inputs, respectively, of the power divider.

According to some embodiments, the first and second variable-frequency-response circuitry may include first and second RF switches, respectively. The first and second RF switches may be coupled to first and second different-length RF transmission paths, respectively. Moreover, the first and second different-length RF transmission paths may be terminated by open circuit or by short circuit.

A method of identifying electrical connections between primary ports of an RF circuit and primary ports of a radio, according to some embodiments herein, may include receiving an RF signal via each of the primary ports of the RF circuit. Moreover, the method may include providing, by the RF circuit, different responses to the RF signal that is received via the primary ports, respectively, of the RF circuit.

In some embodiments, the different responses may be provided by different-length RF transmission paths of the RF circuit that are coupled to the primary ports, respectively, of the RF circuit. Moreover, two of the different-length RF transmission paths may be coupled to two inputs, respectively, of a power divider of the RF circuit.

According to some embodiments, the RF circuit may include first and second power dividers that are coupled to two inputs, respectively, of a third power divider of the RF circuit. Moreover, a first RF transmission path that is coupled between the first power divider and the third power divider may have a different length from a second RF transmission path that is coupled between the second power divider and the third power divider.

In some embodiments, the different responses may be provided by: selecting between a first different-length RF transmission path of the RF circuit and a first equal-length RF transmission path of the RF circuit that are both coupled between a secondary port of the RF circuit and a first of the primary ports of the RF circuit; and selecting between a second different-length RF transmission path of the RF circuit and a second equal-length RF transmission path of the RF circuit that are both coupled between the secondary port and a second of the primary ports of the RF circuit.

According to some embodiments, the different responses may be provided by frequency-selective RF transmission paths of the RF circuit that are coupled to the primary ports, respectively, of the RF circuit.

DETAILED DESCRIPTION

Figure 1A:
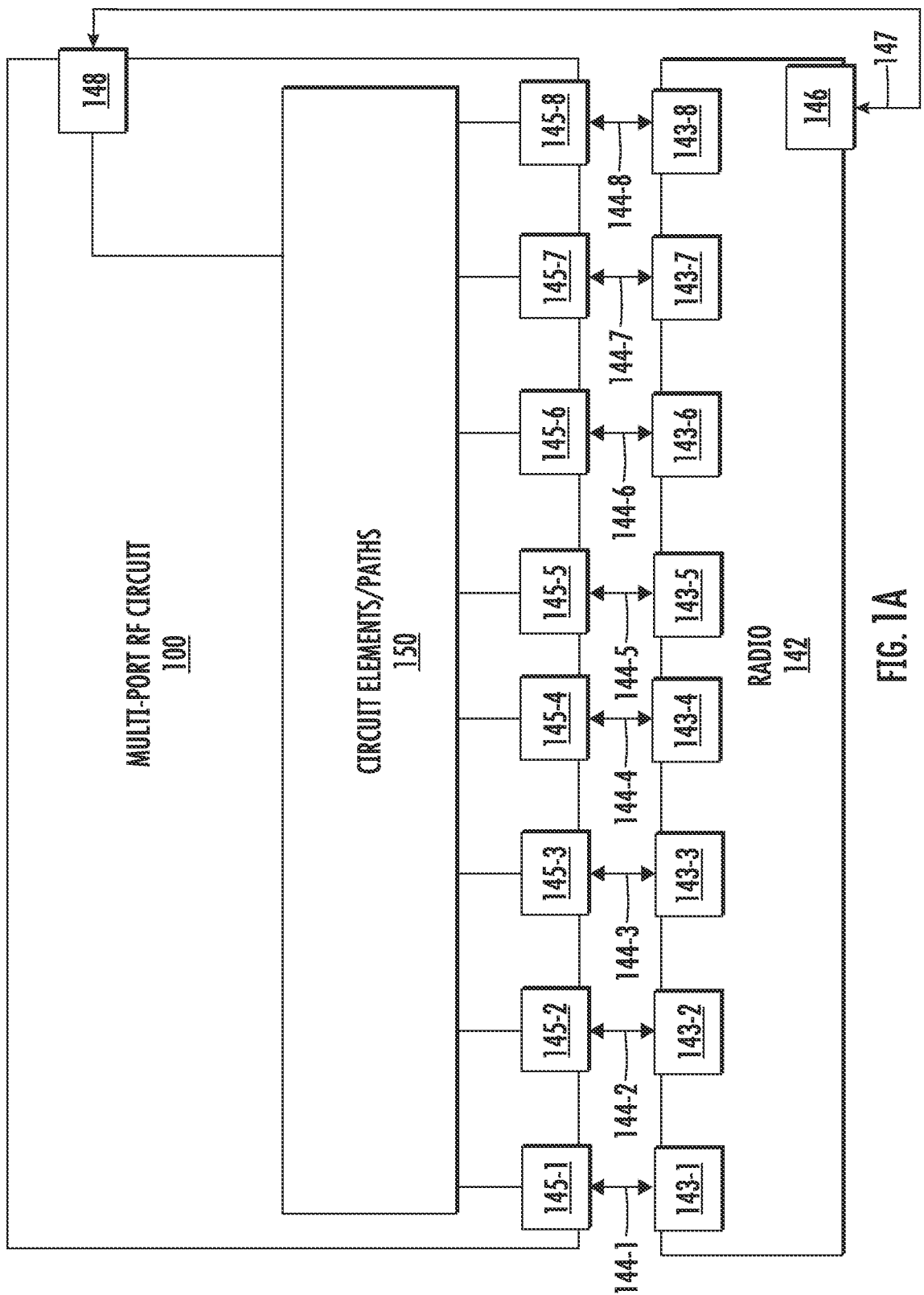
FIG. 1A is a schematic block diagram of ports of a multi-port RF circuit electrically connected to ports of a radio, according to embodiments of the present inventive concepts.

Pursuant to embodiments of the present inventive concepts, methods of identifying electrical connections between ports of an RF circuit and ports of a radio are provided. Related RF circuits are also provided. In some embodiments, an RF circuit may include a modified calibration circuit design that is used to identify which radio port is connected to which RF circuit port. Moreover, known characteristics of the RF circuit may be used to identify electrical connections to its ports.

For example, a multi-port RF circuit may have a set of M primary ports and a set of N secondary ports. A multi-port radio may have a set of P>M primary ports, out of which M are to be connected (via M RF transmission lines, such as cables) to respective M primary ports of the RF circuit. In particular, the radio may need to have more primary ports than the RF circuit. Also, the radio may have at least one secondary port, out of which at least one port is connected via an RF transmission line to a respective secondary port of the RF circuit. In some embodiments, primary ports may be input/output ports and secondary ports may be output/calibration ports.

The following information may be unknown: (1) which of the M primary ports of the radio is connected to which primary port of the RF circuit; and (2) the electrical lengths of the M RF transmission lines between the primary ports of the radio and primary ports of the RF circuit. In some embodiments, however, the electrical lengths of the M RF transmission lines may be relatively equal (e.g., phase delays provided thereby may vary by under 45 degrees).

It may be assumed that an RF connection exists between at least one of the secondary ports of the RF circuit and all of the primary ports of the RF circuit. The phase delay between the M primary ports of the RF circuit and one of the secondary ports of the RF circuit is denoted phi_1, . . . , phi_m, . . . , phi_M. It may be further assumed that the delay values phi_m are all known to sufficient precision. Using these assumptions, various methods according to the present inventive concepts can determine if the primary ports of the RF circuit and the primary ports of the radio are properly connected to each other.

In particular, the present inventive concepts may use a multi-port RF circuit that is configured to provide different responses to an RF signal that is received from a multi-port radio via respective primary ports of the RF circuit. The different responses, which may be different frequency responses or different delay responses, can be used to identify which of the primary ports of the RF circuit is connected to which of the primary ports of the radio.

For example, the different responses may be provided by different-length RF transmission paths of the RF circuit that are coupled to the primary ports, respectively, of the RF circuit. As another example, the different responses may be provided by selecting between (i) a different-length RF transmission path of the RF circuit and (ii) an equal-length RF transmission path of the RF circuit that are both coupled between (a) a secondary port of the RF circuit and (b) each primary port of the RF circuit. In a further example, the different responses may be provided by frequency-selective RF transmission paths of the RF circuit that are coupled to the primary ports, respectively, of the RF circuit.

The present inventive concepts can thus use the RF circuit to confirm electrical connections between the RF circuit and the radio. By contrast, manually verifying the accuracy of such connections can be tedious and time-consuming, particularly when the RF circuit has a large number (e.g., eight, ten, twenty, thirty, or more) of primary ports. Moreover, by reducing the likelihood that misconnected RF circuits will be used in the field, the present inventive concepts can decrease instances of RF circuits operating improperly due to misconnections.

Example embodiments of the present inventive concepts will be described in greater detail with reference to the attached figures.

FIG. 1A is a schematic block diagram of ports 145 of a multi-port RF circuit 100 that are electrically connected to respective ports 143 of a multi-port radio 142, according to embodiments of the present inventive concepts. For example, the circuit 100, which may be a passive RF circuit, may comprise wireless telecommunications network equipment, such as an antenna. As shown in FIG. 1A, ports 145-1 through 145-8 of the circuit 100 are electrically connected to ports 143-1 through 143-8, respectively, of the radio 142 by respective RF transmission lines 144-1 through 144-8, such as coaxial cables. The RF transmission lines 144 may, in some embodiments, be of relatively equal length (e.g., phase delays provided thereby may vary by under 45 degrees). For simplicity of illustration, only eight ports 145 are shown in FIG. 1A. In some embodiments, however, the circuit 100 may include twelve, twenty, thirty, or more ports 145.

In addition to the ports 145, the circuit 100 includes at least one secondary port 148, each of which is electrically connected to a respective secondary port 146 of the radio 142 by a respective RF transmission line 147 (e.g., a coaxial cable). Though one secondary port 148 is shown in FIG. 1A, the circuit 100 may include two, three, or more secondary ports 148. In some embodiments, the secondary port(s) 148 may be referred to as "calibration" port(s), as they may be used to calibrate the amplitude and phase of RF signals received via each of the ports 145, which may be referred to as "primary" ports.

The primary ports 145 may be coupled to the calibration/secondary port(s) 148 via various circuit elements and/or transmission paths 150 of the circuit 100. For example, the circuit elements/paths 150 may include power dividers, RF switches, and/or RF transmission paths. Though the circuit 100 may also include RF couplers, radiating elements, and/or phase shifters, such components of the circuit 100 are omitted from view in FIG. 1A to simplify the illustration.

Figure 1B:
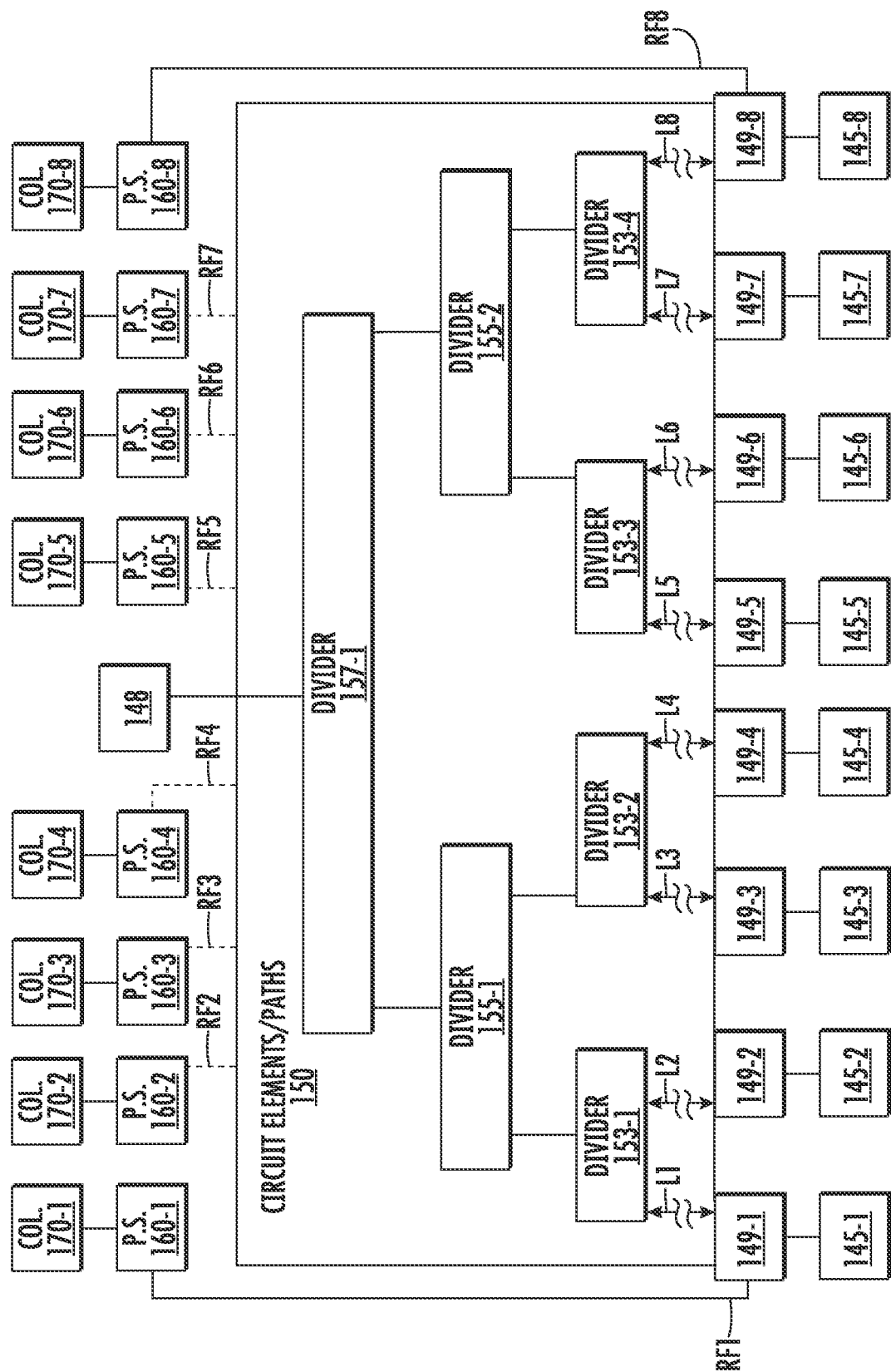
FIGS. 1B-1D are schematic block diagrams of the multi-port RF circuit of FIG. 1A, according to embodiments of the present inventive concepts.
Figure 1C:
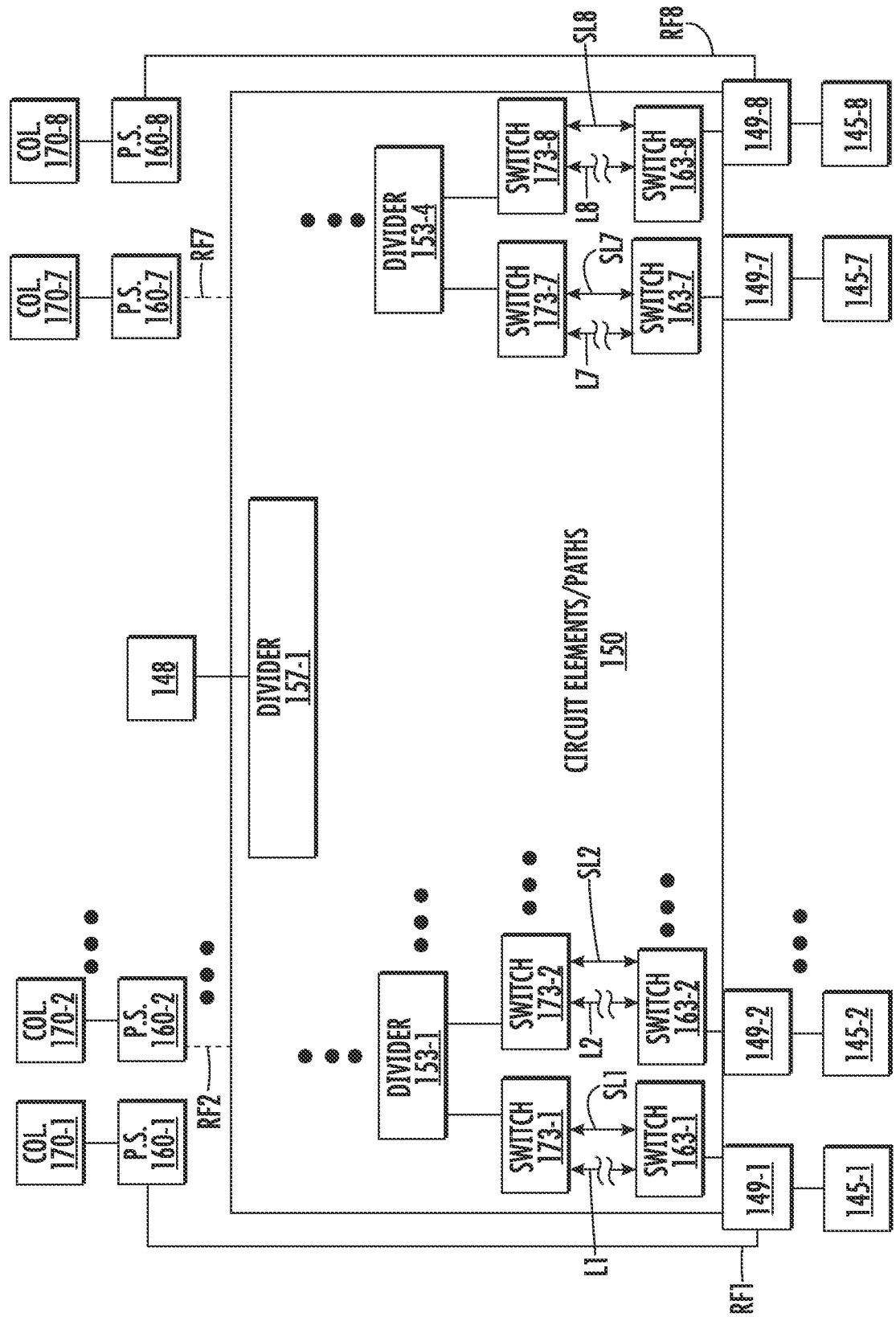
Figure 1D:
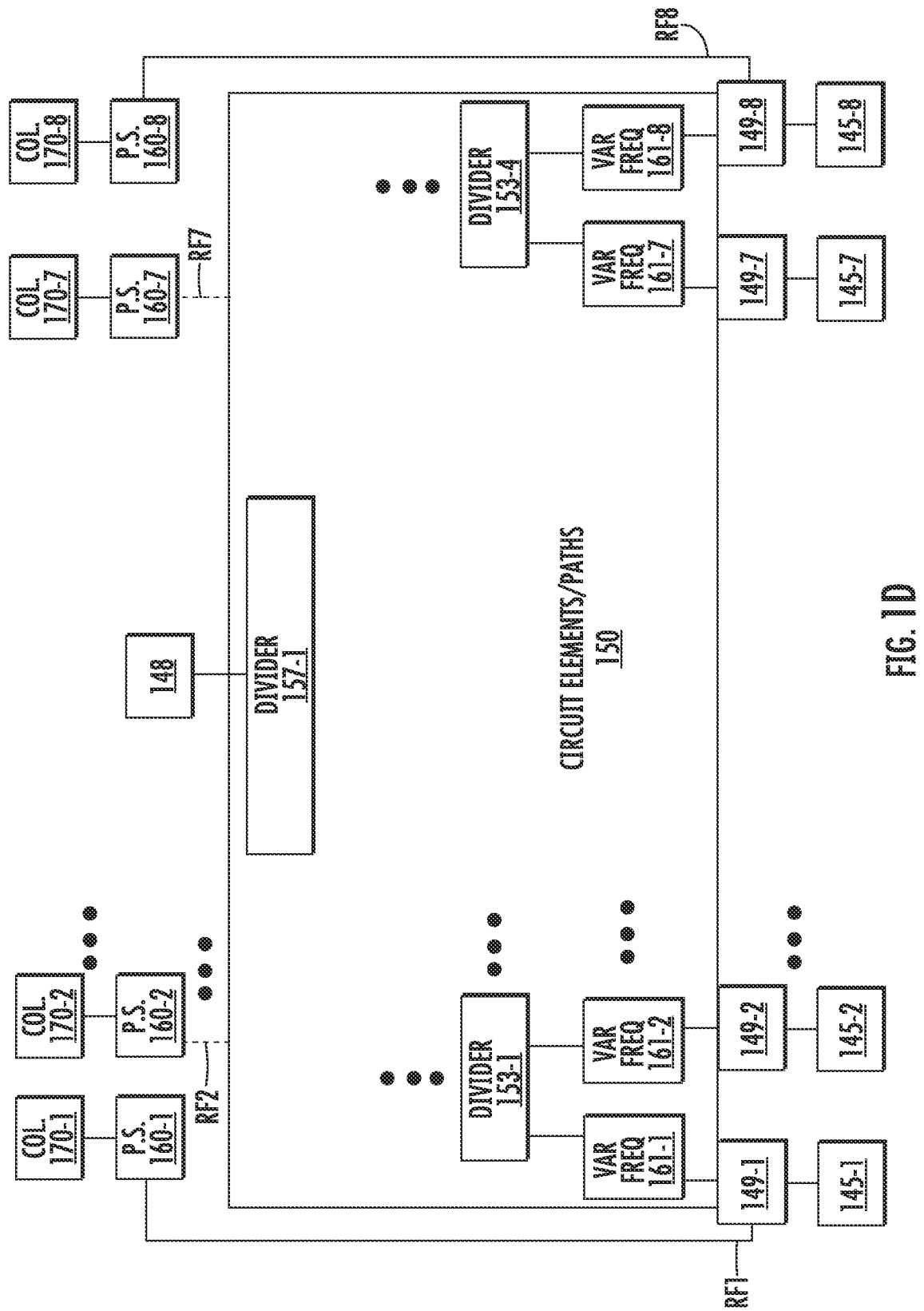

FIGS. 1B-1D are schematic block diagrams of the circuit 100 (FIG. 1A), according to embodiments of the present inventive concepts. As shown in FIGS. 1B-1D, ports 145 of the circuit 100 may be coupled to circuit elements/paths 150 of the circuit 100 via RF couplers 149 of the circuit 100. In particular, couplers 149-1 through 149-8 may be coupled between ports 145-1 through 145-8, respectively, and the circuit elements/paths 150. The couplers 149-1 through 149-8 may be further coupled via RF transmission paths RF1 through RF8, respectively, of the circuit 100 to radiating elements of the circuit 100. For example, the circuit 100 may include arrays (e.g., vertical columns) 170-1 through 170-8 of radiating elements that are coupled to the RF transmission paths RF1 through RF8, respectively.

In some embodiments, the circuit 100 may be a cellular base station antenna and may include phase shifters 160-1 through 160-8 that are coupled between the arrays 170-1 through 170-8, respectively, and the ports 145-1 through 145-8, respectively. For example, radiating elements of the arrays 170 may be configured to transmit and/or receive signals in a frequency band comprising one of the 2300-2690 megahertz ("MHz"), 3300-4200 MHz, and/or 5000-5900 MHz frequency ranges or a portion thereof. Moreover, in some embodiments, a calibration printed circuit board (PCB) 250 (FIG. 3B) that includes the circuit elements/paths 150 may have passive arrays that are connected to different radios. As a result, multiple frequency bands may be used.

Each coupler 149 may split an RF signal between a phase shifter 160 and the circuit elements/paths 150. As an example, FIGS. 1B-1D show that the coupler 149-1 (along with the port 145-1 coupled thereto) is coupled to the phase shifter 160-1 via the transmission path RF1, in addition to being coupled to the circuit elements/paths 150. Similarly, the coupler 149-8 (along with the port 145-8 coupled thereto) is coupled to the phase shifter 160-8 via the transmission path RF8, in addition to being coupled to the circuit elements/paths 150. Though the transmission paths RF2 through RF7 likewise couple the couplers 149-2 through 149-7, respectively, to the phase shifters 160-2 through 160-7, respectively, portions of the transmission paths RF2 through RF7 are omitted from view to simplify FIGS. 1B-1D.

FIGS. 1B-1D also illustrate different examples of circuit elements/paths 150 that can be included in the circuit 100. Referring to FIG. 1B, the circuit elements/paths 150 include different-length RF transmission paths L1 through L8. Accordingly, a secondary port 148 of the circuit 100 is coupled to primary ports 145-1 through 145-8 of the circuit 100 via the paths L1 through L8, respectively. The paths L1 through L8 have different respective lengths (i.e., total distances) and thus can provide different amounts of RF signal delay. For example, the paths L1 through L8 may provide phase delays that vary in increments of 45 degrees, such as respective delays of 0, 45, 90, 135, 180, 225, 270, and 315 degrees. The paths L1 through L8 are not limited to 45-degree delay increments, however, and may instead have phase-delay increments of, for example, 60, 90, 180, or 360 degrees.

Nor are the paths L1 through L8 limited to time/phase delays that increase consecutively from the path L1 to the path L8. Rather, the delays may decrease consecutively from the path L1 to the path L8, or may both increase and decrease. For example, the path L1 may provide a shorter delay than the path L2 and a longer delay than the path L3.

In some embodiments, different lengths may be provided for the paths L1 through L8 by forming different numbers (and/or different sizes) of curves with a conductive material. As an example, the paths L1 through L8 may comprise serpentine shapes with different numbers of switchback bends. Accordingly, the symbol used in FIG. 1B for the paths L1 through L8 merely indicates that each path has a different respective length, and this symbol does not limit the shape of any path. Moreover, the paths L1 through L8 may, in some embodiments, be different RF transmission lines that are on the same PCB.

The circuit elements/paths 150 may further include one or more tiers of power dividers. For example, FIG. 1B illustrates three tiers of power dividers, including a first tier of power dividers 153-1 through 153-4 that are each coupled to two of the paths L1 through L8 (and thus two of the couplers 149). As an example, the paths L1 and L2 are coupled to two inputs, respectively, of the divider 153-1. Also, a second tier includes power dividers 155-1 and 155-2 that are each coupled between (i) two of the dividers 153-1 through 153-4 and (ii) a third-tier power divider 157-1. In embodiments that include more than eight primary ports 145 (and thus more than eight different-length paths among the circuit elements/paths 150), the circuit elements/paths 150 may include four or more tiers of power dividers.

Though the paths L1 through L8 are shown as being coupled between the couplers 149-1 through 149-8, respectively, and the first tier of dividers 153, different-length RF transmission paths may additionally or alternatively be coupled between different tiers of power dividers. For example, a first RF transmission path coupled between the divider 153-1 and the divider 155-1 may have a different length from a second RF transmission path coupled between the divider 153-2 and the divider 155-1. Additionally or alternatively, a first RF transmission path coupled between the divider 155-1 and the divider 157-1 may have a different length from a second RF transmission path coupled between the divider 155-2 and the divider 157-1. Accordingly, some path-length variation (and thus delay variation) may be present between tiers of power dividers.

The circuit elements/paths 150 shown in FIG. 1B may be used to identify electrical connections between the primary ports 145 of the circuit 100 and primary ports 143 (FIG. 1A) of a radio 142 (FIG. 1A). As an example, the paths L1 through L8 of the circuit 100 may be configured so that all phase delay values phi_m are distributed within 360 degrees, such as $phi\_m = (((m-1)/M)*360 \text{ degrees}) + phi\_0$, where phi_0 is an arbitrary constant. Thus, the phase delay can take any value as long as phi_1, . . . , phi_M are distributed within 360 degrees. If phi_1, . . . , phi_M are not within 360 degrees, it may be difficult to distinguish between them (absent use of a technique such as broadband delay estimation). In some embodiments, the circuit elements/paths 150 may provide a beam-forming antenna calibration circuit/network having a fixed phase difference between the paths L1 through L8. For example, the eight paths may provide respective delays of 0, 45, 90, 135, 180, 225, 270, and 315 degrees, and the delays may thus have fixed 45-degree increments.

M denotes the total number of RF transmission lines/paths that connect primary ports 145 of the circuit 100 to primary ports 143 of the radio 142. Moreover, m denotes a particular primary port 145, and k denotes a particular primary port 143. It can generally be assumed that the RF transmission lines 144 have a phase variation of less than $(\frac{1}{2}*(m-1)/M)*360$ degrees.

The total phase delay delta_k can then be measured between the M primary ports 143 and a secondary port 146 (FIG. 1A) of the radio 142. This can be done using one or more of various conventional calibration procedures. In some embodiments, calibration may be performed multiple (e.g., regular) times each day, as temperature differences that the RF transmission lines 144 (e.g., cables) experience throughout a given day may cause variation of phase delays. Frequency drift may also affect phase delays.

The minimum phase delta_0=minimum(delta_k). Connections between the M pairs of ports 143 and 145 that are connected by M RF transmission paths can be identified by port pairs k and m that minimize (delta_k–delta 0)–phi_m.

Referring to FIG. 1C, which shows a different configuration of the circuit elements/paths 150 from that of FIG. 1B, the circuit elements/paths 150 include both (i) different-length RF transmission paths L1 through L8 and (ii) equal-length paths SL1 through SL8. Accordingly, primary ports 145 of the circuit 100 are coupled to a secondary port 148 of the circuit 100 by both (i) the paths L1 through L8 and (ii) the paths SL1 through SL8. Unlike the paths L1 through L8, which have different respective lengths, the paths SL1 through SL8 each have the same length. For simplicity of illustration, third through sixth instances of some elements (e.g., third through sixth ports 145-3 through 145-6) are omitted from view in FIG. 1C.

Also included among the circuit elements/paths 150 of FIG. 1C are RF switches that are coupled between the primary ports 145 and the secondary port 148. For example, the paths L1 through L8 and the paths SL1 through SL8 may be coupled between a first tier of RF switches 163 and a second tier of RF switches 173. As an example, the path L1 and the path SL1 may both be coupled between a first-tier RF switch 163-1 and a second-tier RF switch 173-1. The two tiers of switches 163 and 173 enable selection between different-length and equal-length RF paths, such as between the path L1 and the path SL1. In some embodiments, the RF switches 163 and 173 may be semiconductor-based integrated circuits.

Moreover, power dividers 153 may be included among the circuit elements/paths 150 of FIG. 1C, and two second-tier switches 173 may be coupled to two inputs, respectively, of each divider 153. For simplicity of illustration, connections of the dividers 153 to the port 148 are omitted from view in FIG. 1C. Such connections may be similar to those shown in FIG. 1B.

The circuit elements/paths 150 shown in FIG. 1C may be used to identify electrical connections between the primary ports 145 of the circuit 100 and primary ports 143 (FIG. 1A) of a radio 142 (FIG. 1A). As an example, the circuit 100 may be configured so that the phase delay between M primary ports 145 and a secondary port 148 can be changed between a first state (phi_1, . . . , phi_m, . . . , phi_M) and a second state (phi . . . , phi_m', . . . , phi_M'), both of which states may be known to sufficient precision. In some embodiments, switching between any first and second states described herein may be controlled using a signaling link to an Antenna Interface Standards Group ("AISG") system.

The phase values may be chosen so that the difference phi_m–phi_m' is unique for each m. For example, one convenient choice is phi_m–phi_m'=(m/M)*360 degrees.

The total phase delay delta_k between M primary ports 143 of the radio 142 and a secondary port 146 (FIG. 1A) of the radio 142 can then be measured with the circuit 100 in the first state, and the corresponding total delay delta_k' can be measured with the circuit 100 in the second state.

Correct port pairs (k, m) of the primary ports 143 of the radio 142 and the primary ports 145 of the circuit 100 can then be identified as the ones that minimize the difference (delta_k–delta_k')–(phi_m–phi_m'). This identification of port pairs (k, m) is an identification of which k (i.e., which port 143) corresponds to which m (i.e., which port 145). Also, calculating the difference (delta_k–delta_k')–(phi_m–phi_m') has the effect of subtracting out everything except for a calibration PCB 250 (FIG. 3B) that includes the circuit elements/paths 150. Moreover, instead of two RF switches 163 and 173, the circuit elements/paths 150 can include a phase shifter or a PIN diode switch that is coupled between each primary port 145 and a secondary port 148. In some embodiments, the circuit elements/paths 150 may provide a beam-forming antenna calibration network including RF switches 163 and 173 so that the phase delay of each path m can be changed between known values delta_m and delta_m'. When two tiers of RF switches are used, the circuit elements/paths 150 may include a total of 2M RF switches 163 and 173.

Accordingly, different-length and equal-length RF paths may, in some embodiments, be used for (i) a standard operating mode and (ii) a port-identification mode, respectively, of the circuit elements/paths 150. For example, the circuit elements/paths 150 may be part of a calibration PCB 250, and the equal-length RF paths may be used for a standard operating (e.g., calibration) mode of the calibration PCB 250, whereas the different-length RF paths may be used to determine which primary ports 145 of the circuit 100 are coupled to which primary ports 143 of the radio 142.

Referring to FIG. 1D, which shows a different configuration of the circuit elements/paths 150 from those of FIGS. 1B and 1C, the circuit elements/paths 150 include variable-frequency-response circuitry 161 that changes frequency characteristics of an input RF signal. Accordingly, primary ports 145 of the circuit 100 are coupled to a secondary port 148 of the circuit 100 by the variable-frequency-response circuitry 161. For example, the primary ports 145-1 through 145-8 may be coupled to the secondary port 148 via variable-frequency-response circuits 161-1 through 161-8, respectively.

Moreover, power dividers 153 may be included among the circuit elements/paths 150 of FIG. 1D, and two variable-frequency-response circuits 161 may be coupled to two inputs, respectively, of each divider 153. For simplicity of illustration, connections of the dividers 153 to the secondary port 148 are omitted from view in FIG. 1D. Such connections may be similar to those shown in FIG. 1B. Third through sixth instances of some elements (e.g., third through sixth ports 145-3 through 145-6) are also omitted from view in FIG. 1D.

The circuit elements/paths 150 shown in FIG. 1D may be used to identify electrical connections between the primary ports 145 of the circuit 100 and primary ports 143 (FIG. 1A) of a radio 142 (FIG. 1A). As an example, the circuit 100 may be configured so that the frequency response of each RF path (via variable-frequency-response circuitry 161) between M primary ports 145 and a secondary port 148 of the circuit 100 can be changed between a first state and a second state. In the first state, all paths have a similar frequency response. In the second state, each path/primary port m has a predetermined unique frequency response H_m'. For example, after sending an RF signal through eight primary ports 145, eight different frequency responses may be generated by the circuit elements/paths 150.

Moreover, the frequency response G_k' between the primary ports 143 and a secondary port 146 (FIG. 1A) of the radio 142 can be measured in the second state. Accordingly, correct port pairs (k, m) can be identified as the ones that minimize the difference abs(H_m')–abs(G_k') over a frequency of interest, where "abs" denotes the absolute value.

Figure 1E:
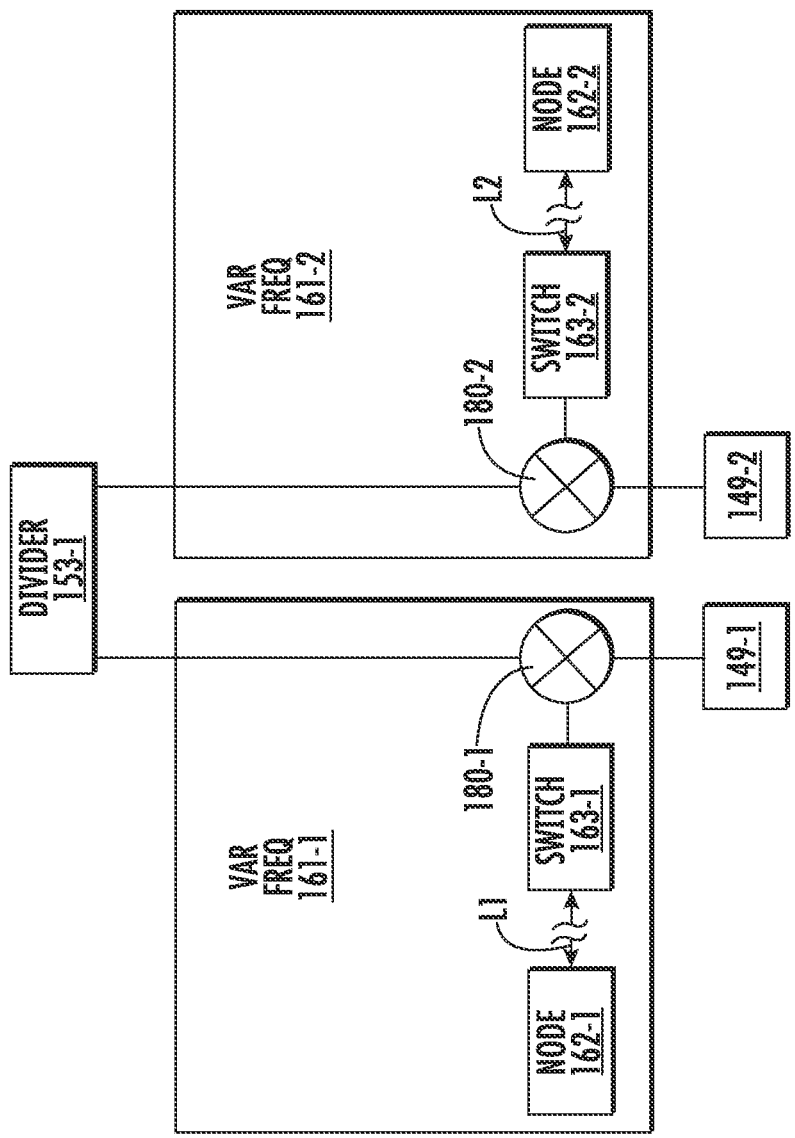
FIG. 1E is a schematic block diagram of two of the variable-frequency-response circuits of FIG. 1D.

FIG. 1E is a schematic block diagram of two variable-frequency-response circuits 161. As shown in FIG. 1E, variable-frequency-response circuits 161-1 and 161-2 may include respective RF switches 163-1 and 163-2. The switches 163-1 and 163-2 may be coupled between respective junctions (e.g., transmission-line junctions) 180-1 and 180-2 and respective different-length RF paths L1 and L2. The junctions 180-1 and 180-2 may be coupled to two input ports, respectively, of a power divider 153-1. The junctions 180-1 and 180-2 may also be coupled to RF couplers 149-1 and 149-2, respectively. Accordingly, each switch 163 can change frequency characteristics of an RF transmission between a respective coupler 149 and the divider 153-1.

Moreover, the paths L1 and L2 may terminate at nodes 162-1 and 162-2, respectively. For a nominally lossless case, each node 162 may provide an open circuit or a short circuit for the path coupled thereto. If an open circuit is provided by a node 162, then a path can be selected to be a quarter-wavelength long at a given frequency. If a switch 163 is closed, then a shunt resonator may be provided that presents a short circuit at a junction 180 for the frequency, thereby effectively blocking RF transmission at the frequency between a coupler 149 and a divider 153. If a short circuit is provided by a node 162, then a path can be selected to be a half-wavelength long, and the same effect can be provided as when a quarter wavelength is selected for an open circuit.

Accordingly, in some embodiments, circuit elements/paths 150 (FIG. 1D) may provide a beam-forming antenna calibration network including switches 163 that facilitate connecting to a shunt resonator with different lengths. If the Q-value of the resonator is sufficient, M different paths can be identified using only M RF switches 163.

Figure 2:
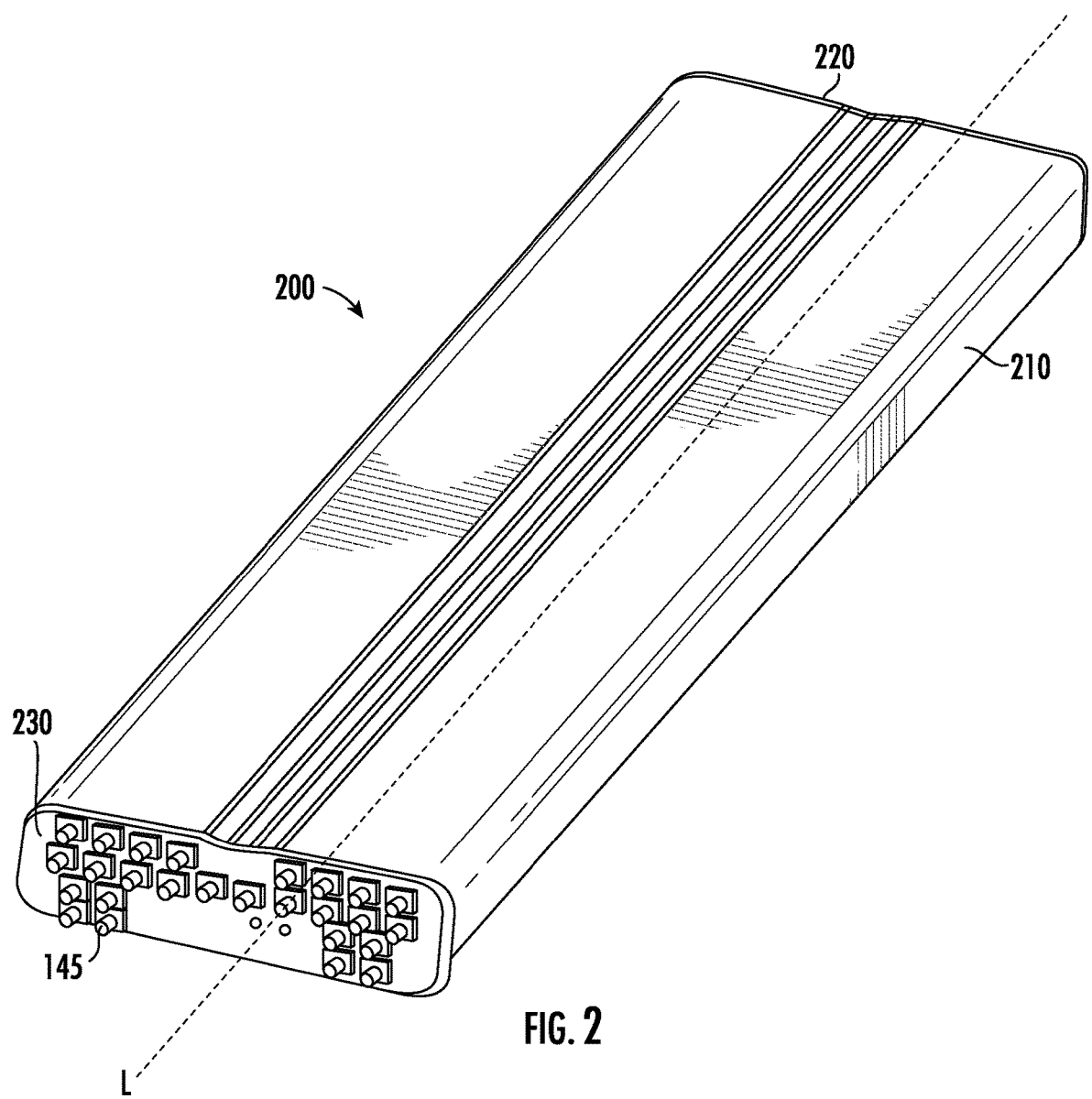
FIG. 2 is a front perspective view of a base station antenna, according to embodiments of the present inventive concepts.

FIG. 2 is a front perspective view of a base station antenna 200, according to embodiments of the present inventive concepts. The antenna 200 may be, for example, a cellular base station antenna at a macrocell base station or at a small cell base station. As shown in FIG. 2, the antenna 200 is an elongated structure and has a generally rectangular shape. The antenna 200 includes a radome 210. In some embodiments, the antenna 200 further includes a top end cap 220 and/or a bottom end cap 230. For example, the radome 210, in combination with the top end cap 220, may comprise a single unit, which may be helpful for waterproofing the antenna 200. The bottom end cap 230 is usually a separate piece and may include a plurality of RF connectors 145 mounted therein. The connectors 145, which may also be referred to herein as "ports," are not limited, however, to being located on the bottom end cap 230. Rather, one or more of the connectors 145 may be provided on, for example, the rear (i.e., back) side of the radome 210 that is opposite the front side of the radome 210. The antenna 200 is typically mounted in a vertical configuration (i.e., the long side of the antenna 200 extends along a vertical axis L with respect to Earth).

Figure 3A:
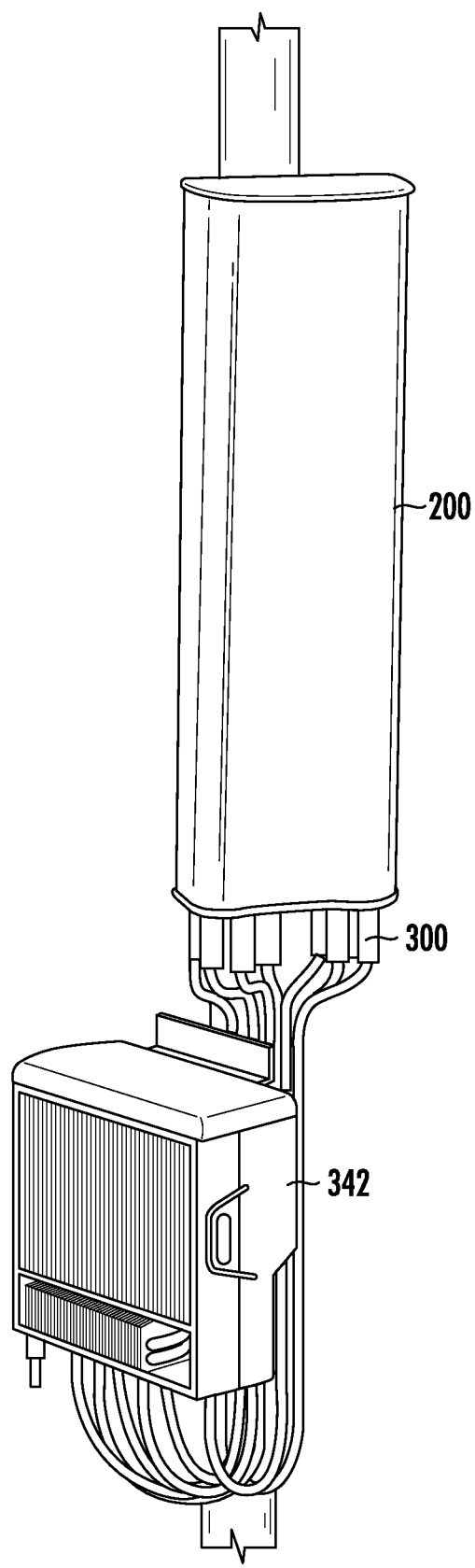
FIG. 3A is a front perspective view of the base station antenna of FIG. 2 electrically connected to a radio.

FIG. 3A is a front perspective view of the antenna 200 electrically connected to a cellular base station radio 342 by cables 300, which are a type of RF transmission line 144 (FIG. 1A). Accordingly, in some embodiments, a multi-port RF circuit 100 (FIG. 1A) may be an antenna 200, a radio 142 (FIG. 1A) may be a cellular base station radio 342, and the antenna 200 and the radio 342 may be located at (e.g., may be components of) a cellular base station.

Figure 3B:
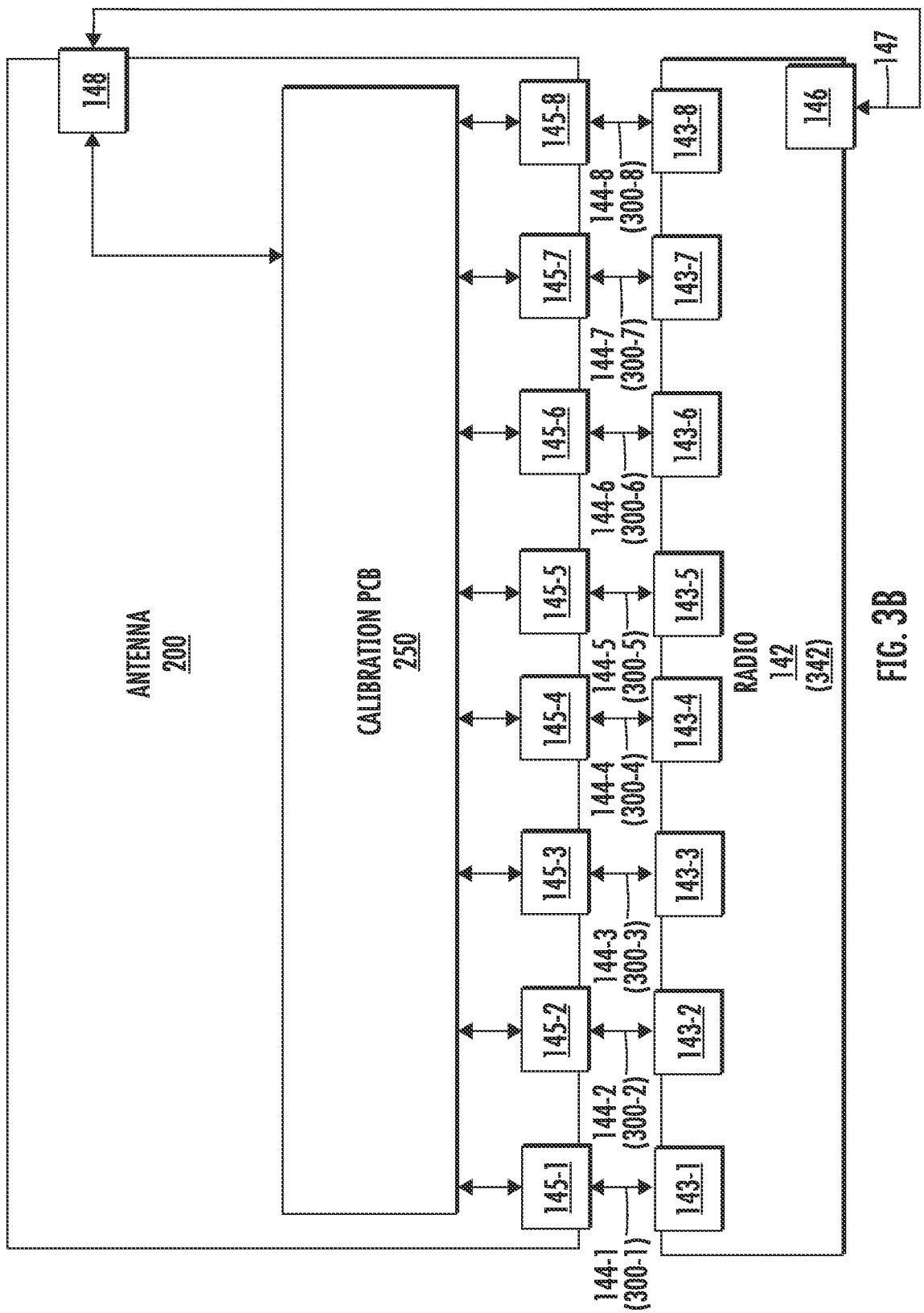
FIG. 3B is a schematic block diagram of ports of the antenna of FIG. 3A electrically connected to ports of the radio of FIG. 3A.

FIG. 3B is a schematic block diagram of ports 145 of the antenna 200 that are electrically connected to respective ports 143 of the radio 342. For example, the radio 342 may be a beam-forming radio or multiple-input, multiple-output ("MIMO") radio of a cellular base station, and the ports 143 may be beam-former ports or MIMO ports. As shown in FIG. 3B, the ports 145-1 through 145-8 of the antenna 200 are electrically connected to ports 143-1 through 143-8, respectively, of the radio 342 by respective cables 300-1 through 300-8, such as coaxial cables. For simplicity of illustration, only eight ports 145 are shown in FIG. 3B. In some embodiments, however, the antenna 200 may include ten, twelve, twenty, thirty, or more ports 145.

The antenna 200 may include a calibration PCB 250 that couples the ports 145 to a secondary port 148. The secondary port 148 may be used to calibrate the amplitude and phase of RF signals received via each of the ports 145, and thus may be a calibration port. The calibration PCB 250 may comprise circuit elements/paths 150 of any of FIGS. 1B-1D. In some embodiments, the PCB 250 may have a phase offset that is known by, for example, the radio 342. Examples of calibration circuits (e.g., calibration PCBs) that may be used with antennas are discussed in U.S. Patent Application No. 62/925,088 and International Patent Application No. PCT/US2019/051873, the disclosures of which are hereby incorporated herein by reference in their entireties.

Moreover, for simplicity of illustration, phase shifters 160, arrays 170 of radiating elements, and RF transmission paths RF1 through RF8 of FIGS. 1B-1D are omitted from view in FIG. 3B. The phase shifters 160, arrays 170, and paths RF1 through RF8, however, may be included in the antenna 200 and may be coupled as described herein with respect to FIGS. 1B-1D.

Figure 4:
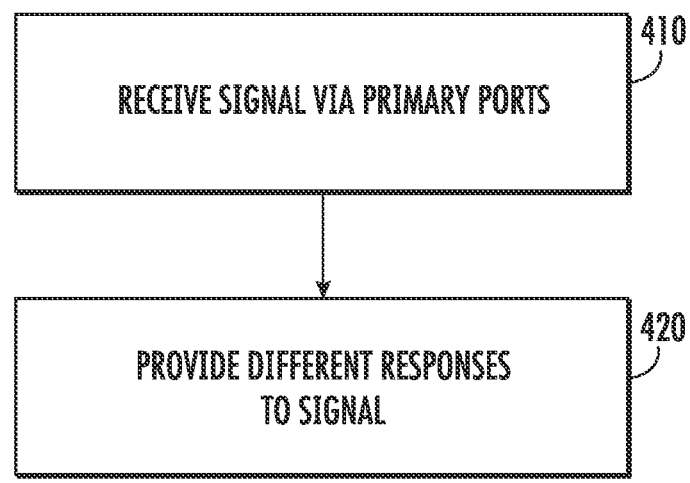
FIG. 4 is a flowchart illustrating operations of identifying electrical connections between a multi-port RF circuit and a radio, according to embodiments of the present inventive concepts.

FIG. 4 is a flowchart illustrating operations of identifying electrical connections between ports 145 (FIG. 1A) of a multi-port RF circuit 100 (FIG. 1A) and ports 143 (FIG. 1A) of a radio 142 (FIG. 1A), according to embodiments of the present inventive concepts. As shown in FIG. 4, the operations may include receiving (Block 410) an RF signal via each of the ports 145. Moreover, the operations may include providing (Block 420), by the circuit 100, different responses to the RF signal that is received via the ports 145, respectively. The different responses may be different frequency responses or different delay responses.

For example, referring to FIG. 1B, the different responses to the RF signal may be provided by different-length RF transmission paths L1 through L8 of the circuit 100 that are coupled to the ports 145, respectively. Accordingly, the paths L1 through L8 may provide eight different delay responses, respectively. Moreover, pairs of the paths L1 through L8 may, in some embodiments, be coupled to respective pairs of inputs of a power divider 153 of the circuit 100.

As another example, referring to FIG. 1C, providing the different responses to the RF signal may include selecting between (i) a different-length RF transmission path (e.g., a path L1) and (ii) an equal-length RF transmission path (e.g., a path SL1) that are both coupled between the same primary port 145 and a secondary port 148. This selection process may be repeated for pairs of RF paths coupled to each respective primary port 145. Accordingly, the selection process may provide different delay responses when the RF signal is received via different ports 145, respectively.

In a further example, referring to FIG. 1D, the different responses to the RF signal may be provided by frequency-selective RF transmission paths of the circuit 100 that are coupled to the ports 145, respectively. For example, each variable-frequency-response circuit 161 (FIG. 1D) may provide a frequency-selective RF transmission path that generates a unique response to the RF signal.

Methods of using circuit elements/paths 150 (FIG. 1A) of a multi-port RF circuit 100 (FIG. 1A) to identify electrical connections between primary ports 145 (FIG. 1A) of the circuit 100 and primary ports 143 (FIG. 1A) of a radio 142 (FIG. 1A) according to embodiments of the present inventive concepts may provide a number of advantages. These advantages include verification of whether electrical connections by a human operator (e.g., an installer connecting a radio 342 to an antenna 200 via cables 300, as shown in FIGS. 3A and 3B) are proper or improper. Accordingly, though cables 300 may initially be connected improperly by an installer between a radio 342 and an antenna 200, by confirming which pair of ports 143 and 145 the installer has connected each cable 300 between, the present inventive concepts can be used to identify such misconnections by the installer before operating the antenna 200 in the field. The present inventive concepts can thus save operator time and reduce potential failures of wireless telecommunications network equipment.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A radio frequency (RF) circuit comprising:
   a plurality of arrays of radiating elements;
   a plurality of primary ports that are coupled to the arrays, respectively; and
   a secondary port that is coupled to the primary ports via a plurality of different-length RF transmission paths, respectively,
   wherein, to identify electrical connections between the primary ports and a radio, the different-length RF transmission paths are configured to provide different responses, respectively, to an RF signal that is received via each of the primary ports.

2. The RF circuit of claim 1, wherein the RF circuit is a base station antenna and further comprises:
   a plurality of phase shifters that are coupled between the arrays, respectively, and the primary ports, respectively.

3. The RF circuit of claim 2, further comprising a plurality of RF couplers that are coupled between the phase shifters, respectively, and the primary ports, respectively.

4. The RF circuit of claim 3, further comprising a plurality of power dividers, wherein the RF couplers are further coupled to the power dividers.

5. The RF circuit of claim 4, wherein two of the different-length RF transmission paths are coupled to two inputs, respectively, of a first of the power dividers.

6. The RF circuit of claim 5, further comprising a calibration printed circuit board (PCB) that comprises the power dividers and the different-length RF transmission paths, wherein the secondary port comprises a calibration port of the RF circuit.

7. The RF circuit of claim 6,
   wherein the primary ports are further coupled to a plurality of primary ports, respectively, of the radio, and
   wherein the calibration port is coupled to a secondary port of the radio.

8. The RF circuit of claim 1, wherein a plurality of equal-length RF transmission paths further couple the primary ports, respectively, to the secondary port.

9. The RF circuit of claim 8, further comprising a plurality of RF switches that are coupled between the primary ports, respectively, and the secondary port.

10. The RF circuit of claim 9, wherein a first of the different-length RF transmission paths and a first of the equal-length RF transmission paths are coupled to a first of the RF switches.

11. The RF circuit of claim 10, wherein the first of the different-length RF transmission paths and the first of the equal-length RF transmission paths are coupled between the first of the RF switches and a first of another plurality of RF switches.

12. The RF circuit of claim 10, further comprising a plurality of power dividers, wherein the first of the RF switches and a second of the RF switches are coupled to two inputs, respectively, of a first of the power dividers.

13. A radio frequency (RF) circuit comprising:
    first and second primary ports;

a secondary port that is coupled to the first and second primary ports via first and second variable-frequency-response circuitry, respectively; and wherein the first and second variable-frequency-response circuitry comprise first and second RF switches, respectively, and wherein the first and second RF switches are coupled to first and second different-length RF transmission paths, respectively, wherein each of the first and second variable-frequency-response circuitry provides a frequency-selective RF transmission path that generates a unique response to an RF signal at the first and second primary ports, respectively.

14. The RF circuit of claim 13, wherein the first and second different-length RF transmission paths are terminated by open circuit or by short circuit.

15. The RF circuit of claim 13, further comprising a power divider, wherein the first and second variable-frequency-response circuitry are coupled to two inputs, respectively, of the power divider.

16. A method of identifying electrical connections between primary ports of a radio frequency (RF) circuit and primary ports of a radio, the method comprising:

receiving an RF signal via each of the primary ports of the RF circuit; and providing, by the RF circuit, different frequency response characteristics to the RF signal that is received via the primary ports, respectively, of the RF circuit, wherein the different frequency response characteristics are provided by frequency-selective RF transmission paths of the RF circuit that are coupled to the primary ports, respectively, of the RF circuit, wherein the different frequency response characteristics are provided by:

selecting between a first different-length RF transmission path of the RF circuit and a first equal-length RF transmission path of the RF circuit that are both coupled between a secondary port of the RF circuit and a first of the primary ports of the RF circuit; and selecting between a second different-length RF transmission path of the RF circuit and a second equal-length RF transmission path of the RF circuit that are both coupled between the secondary port and a second of the primary ports of the RF circuit.

17. The method of claim 16, wherein the RF circuit comprises first and second power dividers that are coupled to two inputs, respectively, of a third power divider of the RF circuit, and wherein a first RF transmission path that is coupled between the first power divider and the third power divider has a different length from a second RF transmission path that is coupled between the second power divider and the third power divider.

* * * * *